United States Patent
Evans et al.

(10) Patent No.: US 6,276,484 B1
(45) Date of Patent: Aug. 21, 2001

(54) IMPACT BAR

(75) Inventors: David K. Evans, Lapeer; Thomas M. Knowles, Sterling Heights, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/408,620

(22) Filed: Sep. 30, 1999

(51) Int. Cl.⁷ .............................. B60K 1/00; B60K 5/00
(52) U.S. Cl. .................. 180/291; 180/232; 280/784; 296/188
(58) Field of Search ..................... 180/291, 299, 180/300, 292, 311, 312, 232; 280/784; 296/188

(56) References Cited

U.S. PATENT DOCUMENTS

| | | | |
|---|---|---|---|
| 2,022,111 | * 11/1935 | Evans | 180/64 |
| 2,836,254 | * 5/1958 | Boehner | 180/64 |
| 3,236,326 | * 2/1966 | Reynolds | 180/64 |
| 3,655,237 | * 4/1972 | Pitman | 296/188 |
| 3,827,525 | 8/1974 | Felzer | 180/82 R |
| 4,073,357 | 2/1978 | Danckert | 180/64 R |
| 4,147,318 | * 4/1979 | McDonald | 180/64 R |
| 4,181,192 | 1/1980 | Danckert | 180/232 |
| 4,270,625 | * 6/1981 | Nishimura et al. | 180/291 |
| 4,424,986 | 1/1984 | Mizuno et al. | 280/784 |
| 4,449,603 | 5/1984 | Langwieder et al. | 180/232 |
| 4,767,153 | 8/1988 | Kawasaki et al. | 296/194 |
| 4,821,827 | * 4/1989 | Reese | 180/61 |
| 4,836,321 | 6/1989 | Baumann | 180/232 |
| 5,078,230 | 1/1992 | Hasuike | 180/291 |
| 5,267,630 | 12/1993 | Watanabe et al. | 180/297 |
| 5,372,216 | 12/1994 | Tsuji et al. | 180/274 |
| 5,437,344 | 8/1995 | Wada | 180/291 |
| 5,466,006 | 11/1995 | Neumann | 280/784 |
| 5,472,063 | 12/1995 | Watanabe et al. | 180/274 |
| 5,477,938 | 12/1995 | Tsuji et al. | 180/274 |
| 5,595,256 | 1/1997 | Mueller | 180/232 |
| 5,605,353 | 2/1997 | Moss et al. | 280/784 |
| 5,605,371 | 2/1997 | Borchelt et al. | 296/188 |
| 5,915,494 | 6/1999 | Matsumura et al. | 180/232 |
| 5,947,223 | * 9/1999 | Rebmann | 180/232 |

* cited by examiner

Primary Examiner—Paul N. Dickson
Assistant Examiner—Bridget Avery
(74) Attorney, Agent, or Firm—Mark P. Calcaterra

(57) ABSTRACT

Apparatus for inhibiting substantial rearward displacement of an automotive vehicle's engine/transmission powertrain and for transferring rearward thrust of the engine to support structure of the vehicle. A rigid transversely extending cross beam in the form of a hollow tube is secured to the support structure and located just rearwardly of the powertrain. An impact member is secured to the engine/transmission in a position between the engine and the cross beam. The impact member is in the form of an elongated, generally C-shaped bar with its opposite ends secured to the engine/transmission. The impact bar has an intermediate portion formed with a concave section spaced from and opposed to the cross beam member. Rearward thrust of the engine/transmission is transmitted to the cross beam and ultimately to the support structure of the vehicle, inhibiting substantial rearward movement of the engine/transmission.

6 Claims, 4 Drawing Sheets

120 # IMPACT BAR

This invention relates generally to apparatus for restraining rearward displacement of an engine/transmission combination of an automotive vehicle.

BACKGROUND OF THE INVENTION

When an automotive vehicle impacts an object, the engine/transmission may be urged rearwardly toward the passenger compartment. It is desirable to inhibit rearward displacement of the engine/transmission.

In accordance with the present invention, an impact member is secured to the engine in a position between the engine/transmission and a vehicle framing member which comprises the vehicle's support structure. The impact member and framing member are arranged and constructed such that the impact member will engage the frame member whenever the engine/transmission is displaced rearwardly which inhibits further rearward displacement. The forces caused by rearward movement of the engine/transmission is thus taken-up by the vehicle's support structure.

Preferably, the impact member is in the form of an elongated bar configured into a generally C-shape and having opposite ends secured to the engine/transmission. The vehicle preferably includes a frame member adjacent and to the rear of the engine/transmission usually in the form of an elongated cross beam which may be in the form of a hollow tube extending laterally across the vehicle. Preferably, the impact bar is disposed in a substantially vertical plane and has an intermediate concave section opposed to the cross beam. If the engine/transmission is displaced rearwardly, the concave section of the impact bar engages the cross beam and may be distorted.

One object of this invention is to provide apparatus for restraining rearward displacement of an automotive vehicle engine/transmission when a frontal impact is imposed on the vehicle, having the foregoing features and capabilities.

Another object is to provide apparatus for restraining rearward displacement of the engine/transmission which is composed of a relatively few simple parts, is rugged and durable in use, and is relatively inexpensive to manufacture and easy to install.

These and other objects, features and advantages of the invention will become more apparent as the following description proceeds, especially when considered with the accompanying drawings.

IN THE DRAWINGS

DETAILED DESCRIPTION OF THE PREFERRED EMBODIMENTS

Figure 1:
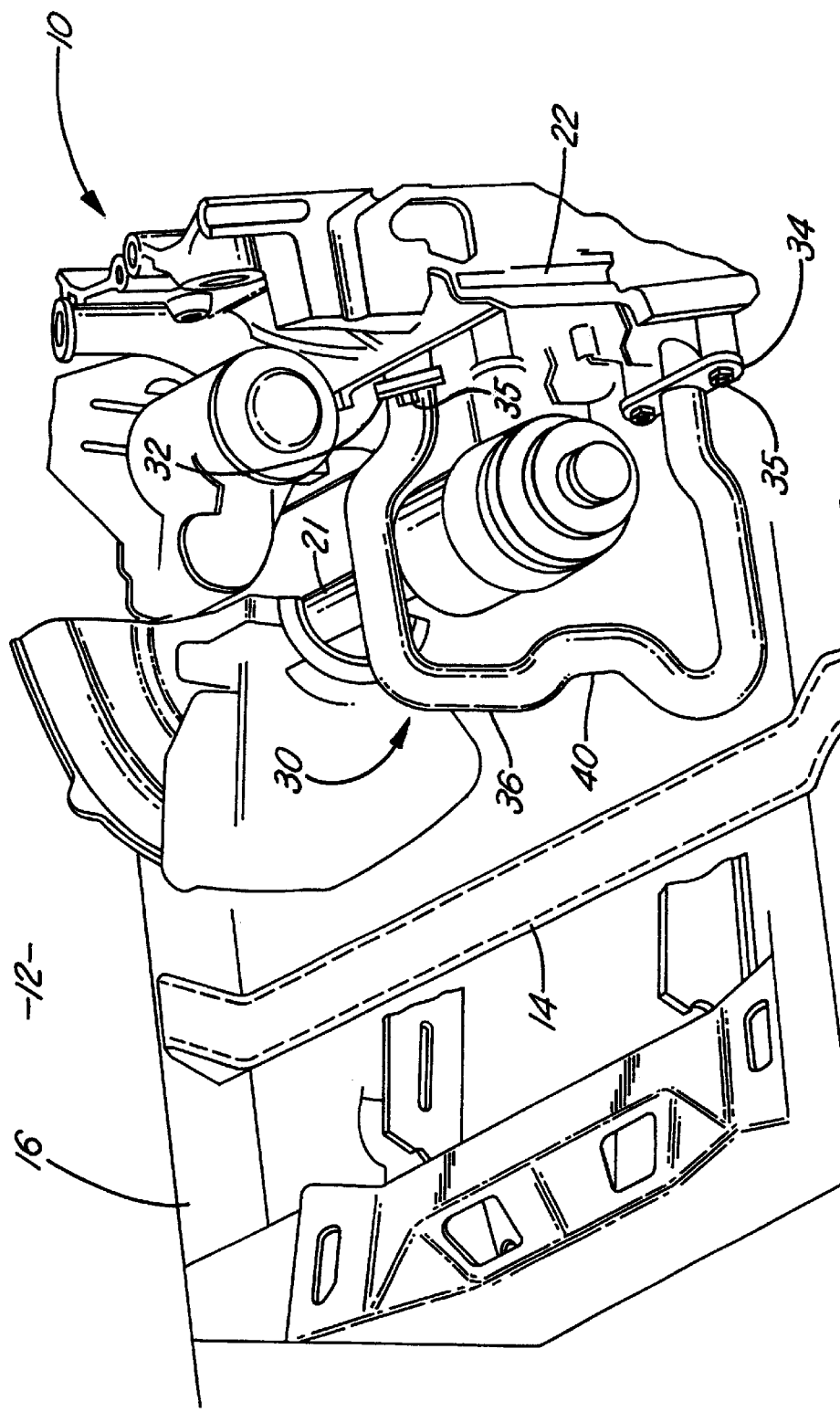
FIG. 1 is a perspective view showing an engine/transmission assembly in an engine compartment of an automotive vehicle, a transverse cross beam located rearwardly of the engine, and an impact bar between the engine and the cross beam.
Figure 5:
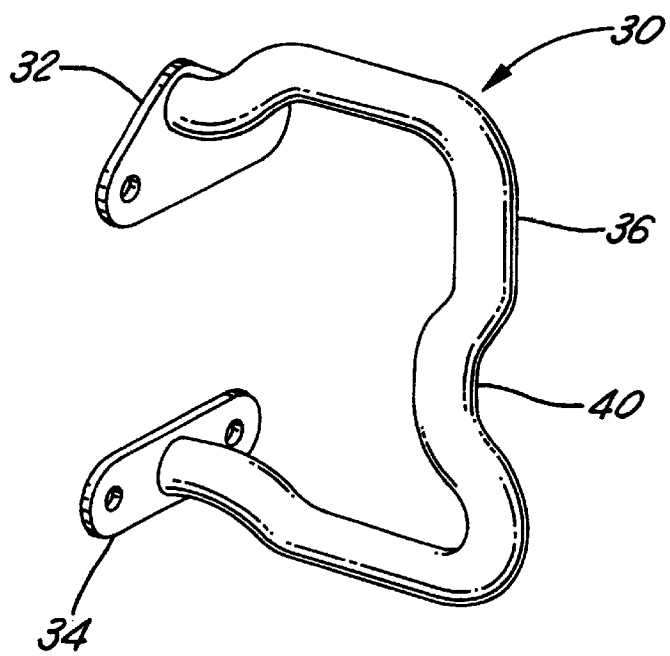
FIG. 5 is a perspective view of the impact bar shown in FIG. 1.

Referring now more particularly to the drawings and especially to FIGS. 1 and 5, there is shown an engine/transmission assembly or power train 10 in an engine compartment 12 of an automotive vehicle. A frame member in the form of a horizontal, tubular cross beam 14 extends transversely of the vehicle perpendicular to the longitudinal center line thereof and is located rearwardly of the engine/transmission 10. The opposite ends of the cross beam 14 are rigidly secured to side rails 16 and 18 of the vehicle frame 20, sometimes referred to as the vehicle and engine support structure. A half shaft 21 is partial visible and is for supporting a front wheel (not shown) of the vehicle.

The engine assembly 10 includes an engine 22 and an elongated impact bar 30 is shown which has a generally C-shape. Impact bar 30 has a transverse flange 32 at its upper end and a transverse flange 34 at its lower end. The flanges 32 and 34 are rigidly secured to the engine 22 by suitable fasteners 35.

The impact bar 30 is disposed in a substantially vertical plane between the engine 22 and the cross beam 14. The bar 30 has an intermediate portion 36 which is configured with a concave section 40 spaced forwardly of and in opposed relation to the cross beam 14.

Figure 2:
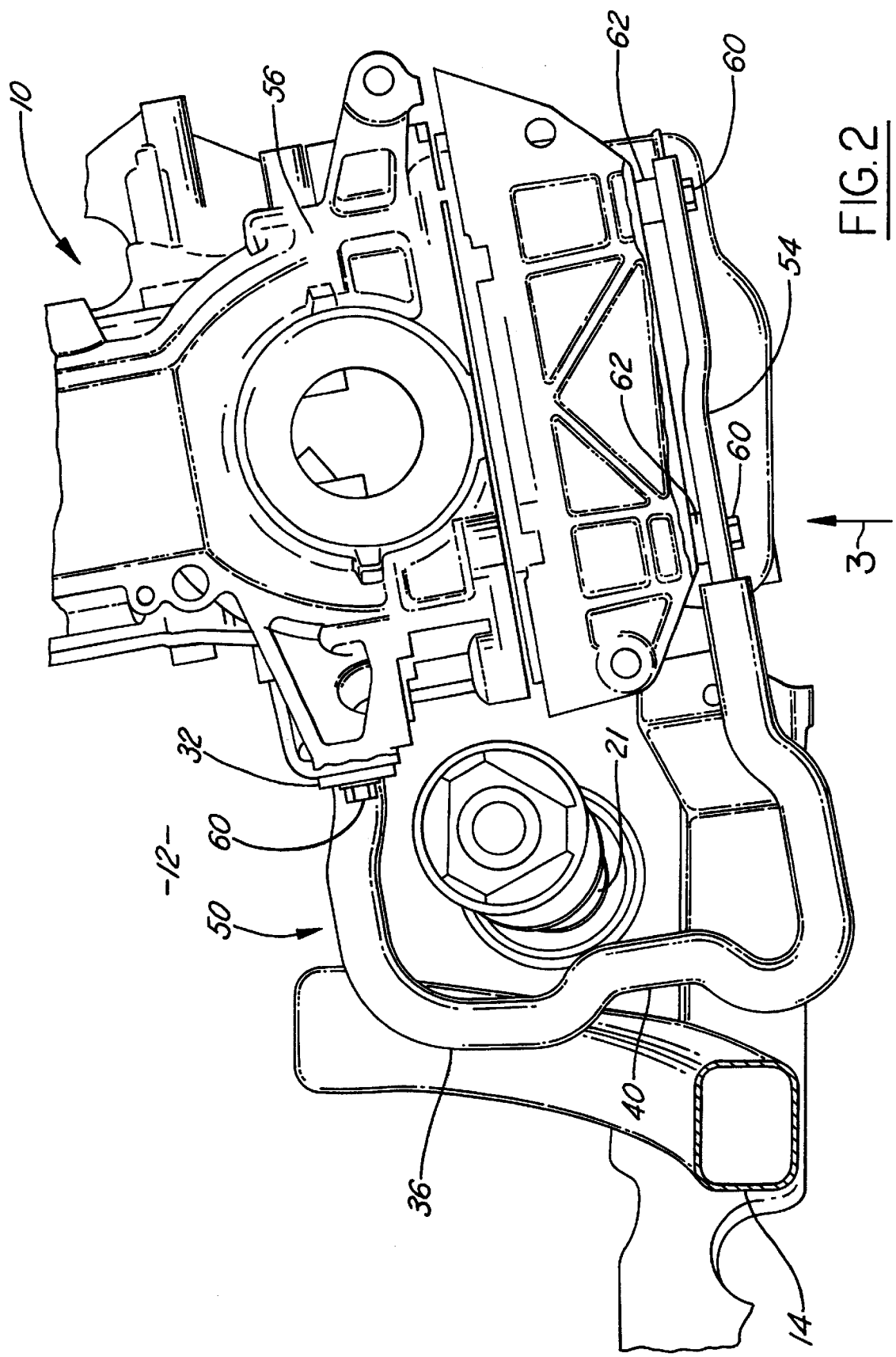
FIG. 2 is a side elevational view showing the engine/transmission the cross beam, and an impact bar with a modified end structure from the impact bar shown in FIG. 1.
Figure 3:
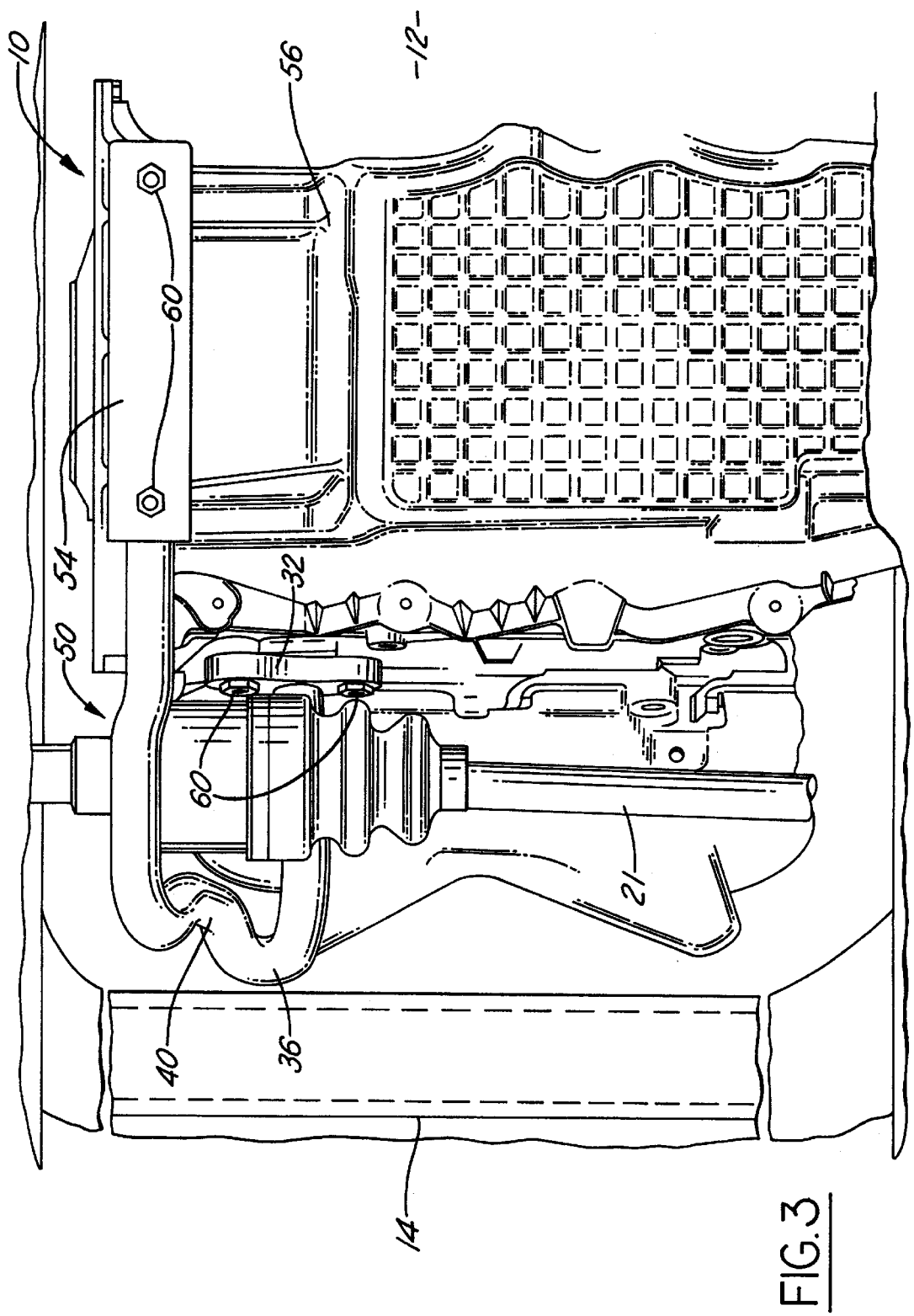
FIG. 3 is a view looking in the direction of the arrow 3 in FIG. 2.
Figure 4:
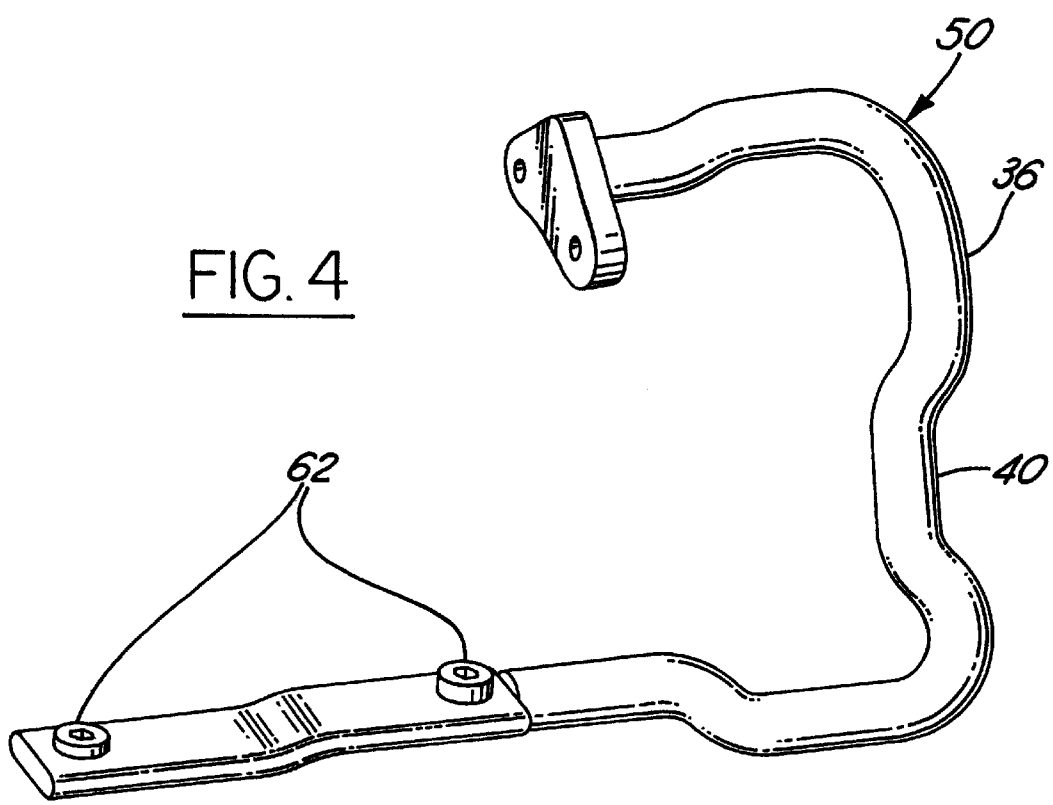
FIG. 4 is a perspective view of the impact bar which is shown in FIGS. 2 and 3.

FIGS. 2–4 show a somewhat modified construction in which the impact bar 50 is of the same generally C-shape as the impact bar 30 and has the same flange 32 at the upper end for attachment to the engine assembly 10. The impact bar 50 differs from the impact bar 30 only in that, instead of the flange 34 at its lower end, it has an elongated and flattened bar extension 54 at its lower end. The flange 32 and extension 54 are rigidly secured to a lower portion 56 of the engine by suitable fasteners 60. Spacers 62 on the extension 54 space the impact bar's extension 54 from the engine. The engine shown in FIG. 2 is basically similar to the engine shown in FIG. 1 except to the extent that it may be modified to enable attachment thereto of the impact bar's extension 54. Like the impact bar 30, the impact bar 50 is disposed in a substantially vertical plane between the engine 56 and the cross beam 14. The intermediate portion 36 of the bar 50 is formed with the same concave section 40 as bar 30 with the section 40 spaced forwardly of and in opposed relation to the cross beam 14.

The arrangement is such that the concave section 40 of the impact bar 30 or 50 engages the cross beam 14 if the engine/transmission powertrain is displaced rearwardly. Rearward movement of the engine is thus inhibited by the interaction between the impact bar and the cross beam and any force is transferred to the vehicle's cross beam 14 and thus to the side rails 16 and 18.

What is claimed is:

1. Apparatus for restraining rearward displacement of an engine assembly of an automotive vehicle when the vehicle is involved in a frontal impact, and transferring rearward thrust of the engine assembly to support structure of the vehicle comprising:

a frame member secured to a support structure in a position rearwardly of an engine assembly, and an impact member secured to said engine assembly in a position between said engine assembly and said frame member, said impact member and frame member being arranged and constructed such that said impact member engages said frame member when said engine assembly is displaced rearwardly, thereby preventing further rearward engine displacement, wherein said impact member is in the form of an elongated, generally C-shaped bar having opposite ends secured to the engine assembly, and said bar is disposed in a vertical plane and has an intermediate portion formed with a concave section opposed to the cross beam.

2. Apparatus as defined in claim 1, wherein said frame member comprises an elongated cross beam extending transversely of the vehicle, said cross beam being in the form of a hollow tube having opposite ends connected to side rails of the vehicle support structure.

3. Apparatus as defined in claim 2, wherein said bar has a transverse flange at each of the ends thereof rigidly secured to the engine assembly.

4. Apparatus as defined in claim 2, wherein said bar has a transverse flange at one of the ends thereof and an elongated flattened bar extension at the other of the ends thereof, and means rigidly securing said flange and said bar extension to the engine assembly.

5. Apparatus for restraining rearward displacement of an engine assembly of an automotive vehicle when the vehicle is involved in a frontal impact, and transferring rearward thrust of the engine assembly to support structure of the vehicle comprising:

a cross beam secured to side rails of a support structure in a position rearwardly of an engine assembly, and an impact member in the form of a C-shaped vertically disposed impact bar secured to the engine assembly between the engine assembly and the cross beam to limit rearward movement of the engine assembly by preventing movement beyond the cross beam.

6. Apparatus as defined in claim 5, wherein set impact bar has an intermediate portion formed with a concave section opposed to said cross beam.

* * * * *